United States Patent
Kopetz

(10) Patent No.: US 10,705,874 B2
(45) Date of Patent: Jul. 7, 2020

(54) METHOD AND APPARATUS FOR DETERMINATION OF SLOT-DURATION IN TIME-TRIGGERED CONTROL SYSTEM

(71) Applicant: TTTech Computertechnik AG, Vienna (AT)

(72) Inventor: Hermann Kopetz, Baden (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 141 days.

(21) Appl. No.: 16/143,632

(22) Filed: Sep. 27, 2018

(65) Prior Publication Data
US 2019/0102217 A1 Apr. 4, 2019

(30) Foreign Application Priority Data
Oct. 4, 2017 (EP) .................................. 17194776

(51) Int. Cl.
*G06F 9/48* (2006.01)
*G06F 17/11* (2006.01)
(Continued)

(52) U.S. Cl.
CPC ......... *G06F 9/485* (2013.01); *G05B 19/0423* (2013.01); *G06F 9/4494* (2018.02);
(Continued)

(58) Field of Classification Search
CPC .................................................. G06F 9/485
See application file for complete search history.

(56) References Cited

U.S. PATENT DOCUMENTS 8,161,486 B2 4/2012 Illmann
2015/0120803 A1* 4/2015 Angelow .............. H04L 12/403
709/202
(Continued)

OTHER PUBLICATIONS

European Search Report for European Application No. 17194776.5 dated May 2, 2018.
(Continued)

*Primary Examiner* — Charlie Sun
(74) *Attorney, Agent, or Firm* — Eversheds Sutherland (US) LLP

(57) ABSTRACT

A method for a determination of the optimal duration of a time slot for computational actions in a time-triggered controller. The controller includes a sensor subsystem, a computational subsystem, an actuator subsystem, and a time-triggered communication system. The time-triggered communication system is placed between the sensor subsystem, the computational subsystem, the actuator subsystem, and a monitor subsystem. An anytime algorithms is executed in the computational subsystem. A plurality of execution slot durations of the anytime algorithms is probed during the development phase, starting from the minimum execution slot duration, increasing this slot duration by the execution slot granularity until the maximum execution slot duration is reached. In each of the execution slot durations, a multitude of frames is executed in a destined application environment. In each frame the computational subsystem calculates imprecise anticipated values of observable state variables by interrupting execution of the anytime algorithm at the end of the provided execution slot duration, using data received from the sensor subsystems at the beginning of the frame.

3 Claims, 1 Drawing Sheet

(51) Int. Cl.
*G05B 19/042* (2006.01)
*G06F 9/448* (2018.01)
*H04L 12/40* (2006.01)

(52) U.S. Cl.
CPC ............ *G06F 9/4887* (2013.01); *G06F 17/11* (2013.01); *H04L 12/40026* (2013.01)

(56) References Cited

U.S. PATENT DOCUMENTS

2017/0161116 A1    6/2017   Kopetz
2017/0249214 A1    8/2017   Kopetz
2017/0256158 A1*   9/2017   Kopetz ............... G08B 29/185

OTHER PUBLICATIONS

Kopetz, H., "Real-Time Systems", Design Principles for Distributed Embedded Applications, p. 64, Springer 2011.
Simon, H.A., "The Architecture of Complexity", Proc. of the American Philosophical Society, vol. 106. No. 6. pp. 467-482. (Dec. 1962).
Wilhelm, R., et al., "The Worse-Case Execution Time Problem—Overview of Methods and Survey of Tools", ACM Transaction on Embedded Computing Systems (TECS)., vol. 7. No. 3. pp. 36:2 to 36:53 (2008).
Dean, T., et al., "An Analysis of Time-Dependent Planning", Proc. of AAAI, vol. 88, pp. 49-54 (1988).
Lee, E., "Fundamental Limits of Cyber-Physical Systems Modeling", ACM Transactions of Cyber-Physical Systems, vol. 1., No. 1. p. 3, (2016).

\* cited by examiner

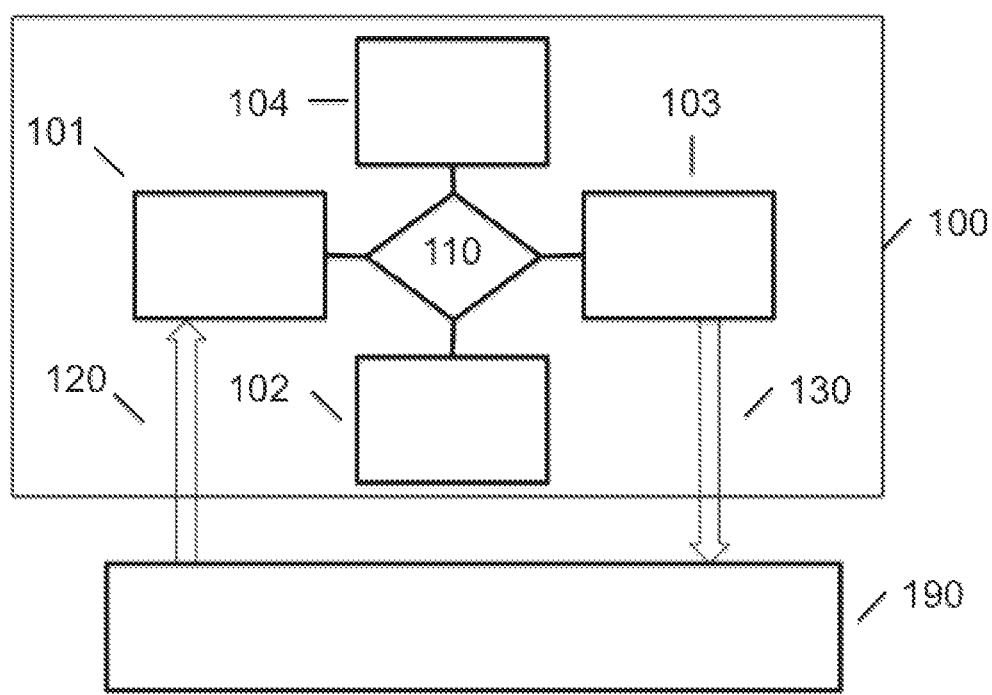

METHOD AND APPARATUS FOR DETERMINATION OF SLOT-DURATION IN TIME-TRIGGERED CONTROL SYSTEM

CROSS-REFERENCE TO RELATED APPLICATIONS

This application claims priority to European Patent Application No. 17194776.5, filed Oct. 4, 2017, which is incorporated herein by reference.

FIELD OF THE INVENTION

This invention relates to a distributed computer system that is deployed to control a controlled object.

In particular, the invention relates to a method for the determination of the optimal duration of the time slot for computational actions in a time-triggered controller consisting of a sensor subsystem, a computational subsystem, an actuator subsystem and a time-triggered communication system.

BACKGROUND OF THE INVENTION

In a control system a controller interacts periodically with a controlled object in the physical world in order to realize the desired behavior of the controlled object.

These periodic interactions between the controller and the controlled object occur at two different periodic instants: (i) the point of observation (or sampling instant) where the controller observes the state of the controlled object and (ii) the point of actuation (or actuation instant) where the controller sets set points of the actuators that act in the physical world in order to influence the future physical behavior of the controlled object.

In many cases the controller is realized by a distributed computer system consisting of node-computers with sensors, node-computers that execute a control model and node-computers that control actuators. The node-computers exchange messages using a real-time communication system.

The sequence of the computational and communication actions between a sampling instant and the corresponding actuation instant forms a frame. The duration of a frame should be constant in a given mode of operation. The end-point of a frame is the start-point of the succeeding frame.

In a time-triggered (TT) controller, where a preferably fault-tolerant global notion of a sparse time base is available at all node-computers, the periodic sampling instants, the periodic actuation instants and the periodic instants when messages are sent and received by the time-triggered communication system are specified during the development phase.

The sparse time base supports the system-wide consistent ordering of events in the temporal domain [1].

It follows that in a time-triggered (TT) controller the slot length for a computational action, i.e., the time interval between the start and the termination of the execution of the control model, is fixed and must be determined a priori during the development phase.

It is the objective of this invention to present a method for the determination of the slot lengths for the computational actions in a time-triggered controller.

This objective is achieved with a method with the features of claim 1.

Anytime Algorithms

The minimal slot length for the execution of the control algorithm in the control model must be long enough that for all data points of the input domain the control model can deliver a satisficing result.

A result is a satisficing result [2] if it is adequate (but not necessarily optimal) in the particular situation and meets all safety assertions.

The WCET (worst-case execution time) analysis of the control algorithm that delivers the satisficing result must be determined by using state-of-the art methods for WCET calculation [3].

The state-of-the art methods for WCET calculation of an algorithm bring about an over-dimensioned slot length because the WCET analysis has to fight two enemies, an enemy from below and an enemy from above. The enemy from below refers to temporal indeterminism that is inherent in modern hardware architectures. The enemy from above refers to algorithmic issues, e.g., the complexity of a computationally expensive algorithm that makes it hard to establish a tight WCET bound for all data points of the given input domain.

It follows that for the majority of data points of the input domain the control algorithm will deliver the satisficing result early and leave a substantial time interval between the termination of the control algorithm and the termination of the provided execution slot duration unused. We call this unused time interval the laxity of an execution slot.

In order to make productive use of the laxity the deployment of anytime algorithms is proposed in control systems [4].

An anytime algorithm consists of a core segment followed by an enhancing segment. The slot length for the execution of the anytime algorithm in the controller must be at least as long as the WCET of the core segment of the anytime algorithm. This minimal duration of the slot length for the computational control action is called the minimum execution slot duration. The execution of the core segment guarantees a satisficing result.

In an anytime algorithm, the satisficing result is iteratively improved by the enhancing segment until the endpoint of the provided execution slot, the deadline is reached. Iterative improvements of the satisficing result are achieved by the repeated execution of the enhancing segment until the deadline is reached. A good example for an anytime algorithm is Newton's method for finding successively better approximations for the roots of an equation.

The slot length for the execution of the anytime algorithm that ensures that the precision of the result of the anytime algorithm is better than a specified precision bound is called the maximum execution slot duration. The result that is delivered at the end of the maximum execution slot duration is called a precise result of the anytime algorithm.

If the provided slot length for the execution of the anytime algorithm is shorter than the maximum execution slot duration then the execution of the anytime algorithm will be interrupted (at the end of the provided slot length) before it can deliver a precise result. We call the result delivered by the anytime algorithm at the instant of interruption an imprecise result of the anytime algorithm.

We call the absolute value of the difference between the precise result of an anytime algorithm and an imprecise result of the anytime algorithm at the instant of interruption the anytime-algorithm impreciseness. The impreciseness of the anytime algorithm will increase, if the execution slot duration of the anytime algorithm is reduced.

Model Based Control

In a model-based control system, the controller contains an approximate model of the behavior of the controlled object (the control model) in its open environment. This control model is used for calculating the set points that are delivered to the actuators at the end of each frame.

The state-space of the control model encompasses four types of variables

- Independent variables of the control system that are set by the operator. The values of these variables specify the objectives and constraints of the control system and are thus determined by an authority outside the control system.
- Independent variables of the controlled object that are set by the controller (i.e. the controller outputs or setpoints for the actuators). The control model calculates new values of these variables during each frame.
- Observable state variables—observable variables denoting the state of the controlled object and the state of the environment at the instant of observation. i.e. the start of a frame.
- Hidden state variables that are part of the model in the controller. The hidden state variables are of eminent importance, since they carry the knowledge acquired in one frame to the following frame.

At the instant beginning of a frame, let us say $frame_k$, of a periodic frame-based controller the observable state variables are observed by the controller. During a frame new values for the independent variables of the controlled object (the setpoints) and anticipated values of the observable and the hidden state variable are calculated by the control model for the instant end of $frame_k$ (that is also the beginning of $frame_{k+1}$).

The difference between the anticipated value of an observable state at the end of $frame_k$ and the observed value of this state variable at the end of $frame_k$, the model error, is an important input to the model for the calculations of the controller outputs in the following frame. After every frame the prediction horizon is shifted one frame further into the future. For this reason model-based control is sometimes called receding horizon control.

Model Error

The following simple example depicts an open system, the temperature control of the liquid in a reservoir for water purification. The temperature of the liquid in the reservoir can be raised by setting the actuator valve that controls the flow of hot water through a pipe system that is contained in the reservoir. Environmental dynamics, e.g., wind or rain, lower the temperature of the liquid. It is the objective of the control system to keep the variable temperature of the liquid in the reservoir at a preset value.

In the model of this control system, the single physical quantity temperature of the liquid is thus represented by three different variables:

- $ts_k$: the desired (but in some operational situations not achievable) value of the independent variable temperature submitted by the operator for the instant beginning of frame k.
- $to_k$: the value of the variable temperature observed at the instant beginning of frame k.
- $tp_k$: the anticipated value of the controlled variable temperature predicted by the model for the instant beginning of frame k (which is also the end of frame k−1).

We call the difference $$me_k = /tp_k - to_k/$$

the model error $me_k$ at the instant beginning of frame k.

The model error is caused by two different phenomena:

(i) Reality has changed since the last instant of observation. The impact of unidentified or unanticipated processes in the environment (environmental dynamics) of an open system increases with the length of a frame (and the timeslots allocated to a computational action).

(ii) Imperfections of the model: The model is not a true image for the behavior of reality. For example, nonlinearities that exist in reality have not been properly modeled.

The model error will increase if we move further away from the instant where the observable state variables of the system have been observed, i.e. if the execution slot duration of the anytime algorithm is increased.

It is impossible to design a model of an open system that will not exhibit a model error, since it is impossible to consider the myriad of phenomena that are present in the environment of an open system [5].

To summarize, the impreciseness of the anytime algorithm will be lowered, if the execution slot duration is increased, but the model error will be lowered if the execution slot duration of the anytime algorithm is reduced.

BRIEF DESCRIPTION OF THE DRAWINGS

FIG. 1 depicts the structure of the envisioned control system.

DETAILED DESCRIPTION

The control system consists of a controller 100 and a controlled object 190. The controller 100 contains a sensor subsystem 101 with sensors 120 that can observe the observable state variables of the controlled object 190, a computational subsystem 102 that provides an execution environment for the anytime control algorithm, an actuator subsystem 103 that provides setpoints to the actuators 130 that influence the value of physical quantities in the controlled object 190, a monitor system 104 that accepts messages from the sensor subsystem and the computational subsystem and a time-triggered communication system 110 that transports the messages among cited subsystems.

During the development phase of the controller 100 a plurality of execution slot durations of the anytime algorithms is probed, starting from the minimum execution slot duration (MIESL), increasing this slot duration by the execution slot granularity (ESG) until the maximum execution slot duration (MAESL) is reached. The execution slot granularity (ESG) is given by $$ESG = (MAESL - MIESL)/N$$

where N denotes the number of slot durations that are probed. In order to achieve a proper execution slot granularity in the temporal domain, the number N preferably is larger than 10.

In each one of the execution slot durations a multitude of frames is executed in a destined application environment. This multitude of frames should be characteristic for the envisioned use—environment of the controller, since the environmental dynamics in an open control system is determined by the given application context. It follows that in the development phase the data collection for the determination of the optimal slot duration is performed in the destined operational environment.

In each frame the computational subsystem 102 calculates the imprecise anticipated values of observable state variables by interrupting the execution of the anytime algorithm at the end of the provided execution slot duration, using the data received from the sensor subsystems at the beginning of the frame. These imprecise anticipated values of observable state variables are sent from the computational subsystem 102 to the monitor subsystem 104 by the time triggered communication system 110.

For each frame the monitor subsystem 104 calculates the precise anticipated values of observable state variables by executing the anytime algorithm until completion using the data received from the sensor subsystems 101 at the beginning of the frame.

For each frame the monitor subsystem 104 computes the anytime-algorithm impreciseness by calculating the absolute values of the respective differences between the precise anticipated values of observable state variables and the imprecise anticipated values of observable state variables contained in the messages delivered from the computational subsystems 102 to the monitor subsystem 104 at the end of the frame.

For each frame the monitor subsystem 104 computes the model error by calculating the absolute values of the difference between the precise anticipated values of observable state variables and the respective acquired values of observable state variables contained in the messages from the sensor subsystem 101 to the monitor subsystem 104 at the end of the frame Before a new slot duration is probed, the monitor subsystem 104 calculates the average anytime-algorithm impreciseness and the average model error in the past slot duration by averaging the results of the multitude of probed frames of that slot.

At the end of the development phase, the set of average anytime-algorithm impreciseness values and the set of average model error values for all probed execution slot durations are available. Out of these sets, the execution time slot where the sum of the average anytime-algorithm impreciseness and the average model error is minimal is selected for deployment in the operation of the computational subsystems 102.

REFERENCE

1. H. Kopetz. *Real-Time Systems—Design Principles for Distributed Embedded Applications*. Springer 2011.
2. H. A Simon. *The Architecture of Complexity*. Proc. of the American Philosophical Society. Vol 106. No. 6. pp. 467-482. 1962.
3. R. Wilhelm et al. *The worst-case execution time problem—on overview of methods and a survey of tools*. ACM Transaction on Embedded Computing Systems (TECS). Vol 7. No. 3. p. 36. 2008.
4. T. Dean and M. Boddy. An Analysis of Time-Dependent Planning. Proc. of AAAI Vol 88. pp. 49-54. 1988
5. Lee, E., *Fundamental Limits of Cyber-Physical Systems Modeling*. ACM Transactions of Cyber-Physical Systems. Vol 1., No. 1. p. 3. 2016

That which is claimed is:

1. A method for determining an optimal duration of a time slot for computational actions in a time-triggered controller comprising a sensor subsystem, a computational subsystem, an actuator subsystem, and a time-triggered communication system in which the time-triggered communication system is between the sensor subsystem, the computational subsystem, the actuator subsystem, and a monitor subsystem, the method comprising:

routing outgoing messages of the sensor subsystem to the computational subsystem and the monitor subsystem via the time-triggered communication system;

routing outgoing messages of the computational subsystem to the actuator subsystem and the monitor subsystem via the time-triggered communication system;

executing anytime algorithms in the computational subsystem;

probing a plurality of execution slot durations of the anytime algorithms during a development phase, starting from a minimum execution slot duration and increasing therefrom by an execution slot granularity until a maximum execution slot duration is reached;

executing, in the plurality of execution slot durations, a multitude of frames in a destined application environment;

calculating, in each frame of the multitude of frames by the computational subsystem, imprecise anticipated values of observable state variables by interrupting the execution of the anytime algorithms at an end of one of the execution slot durations, using data received from the sensor subsystems at a beginning of a frame of the multitude of frames;

calculating, in each frame of the multitude of frames by the monitor subsystem, precise anticipated values of observable state variables by executing the anytime algorithms until completion using data received from the sensor subsystems at the beginning of the frame;

computing, by the monitor subsystem, an anytime-algorithm impreciseness by calculating absolute values of the difference between the precise anticipated values of observable state variables and the imprecise anticipated values of observable state variables contained in the outgoing messages delivered from the computational subsystems to the monitor subsystem at an end of the frame;

computing, by the monitor subsystem, a model error by calculating the absolute values of the difference between the precise anticipated values of observable state variables and the respective acquired values of observable state variables contained in the outgoing messages from the sensor subsystem to the monitor subsystem at the end of the frame;

calculating an average anytime-algorithm impreciseness and an average model error of a slot duration by the monitor subsystem by averaging results of a multitude of probed frames of the slot duration; and selecting, at the end of the development phase, an execution slot duration for the computational subsystem out of the probed execution slot durations, wherein a sum of the average model error and the average anytime-algorithm impreciseness is minimal.

2. The method according to claim 1, wherein data collection for determining the optimal slot duration is performed in a destined operational environment during the development phase.

3. A controller apparatus for determining a slot-duration in a time-triggered control system, the controller apparatus comprising:

a sensor subsystem;
a computational subsystem;
an actuator subsystem;
a monitor subsystem; and
a time-triggered communication system, which time-triggered communication system is placed between the sensor subsystem, the computational subsystem, the actuator subsystem, and the monitor subsystem, wherein the controller apparatus is configured to execute the method of claim 1.

\* \* \* \* \*